United States Patent [19]
Eyerly

[11] Patent Number: 5,216,345
[45] Date of Patent: Jun. 1, 1993

[54] MIXED MODE STEPPER MOTOR CONTROLLER AND METHOD

[75] Inventor: Bruce N. Eyerly, Torrance, Calif.

[73] Assignee: Hughes Aircraft Company, Los Angeles, Calif.

[21] Appl. No.: 878,091

[22] Filed: May 4, 1992

[51] Int. Cl.[5] .............................................. G05B 19/40
[52] U.S. Cl. ....................................... 318/685; 318/696
[58] Field of Search ................................. 318/685, 696

[56] References Cited

U.S. PATENT DOCUMENTS

| | | | |
|---|---|---|---|
| 4,908,561 | 3/1990 | Hashimoto | 318/696 |
| 4,928,049 | 5/1990 | Pietrobon et al. | 318/696 |
| 5,015,937 | 5/1991 | Wright et al. | 318/696 |
| 5,061,888 | 10/1991 | Hiraoka | 318/696 |

Primary Examiner—William M. Shoop, Jr.
Assistant Examiner—Karen Masih
Attorney, Agent, or Firm—William J. Streeter; Wanda K. Denson-Low

[57] ABSTRACT

A mixed mode controller (100) for use with a motor having a mechanism (110, 114) for generating a command signal to operate the motor and a first circuit (104) for adjusting the gain of the command signal to provide high speed operation. A second circuit (102) is provided for converting the command signal to a drive signal to excite a winding (106) and to damp the motor. In a preferred embodiment, a step rate signal introduced into the motor controller (100) is operated upon by an accumulator (110) and a memory (114) to generate a voltage command signal. The motor controller (100) includes a low bandwidth current control feedback loop (104) utilized to adjust the gain of the voltage command signal by comparing a command motor current and an actual motor current in a summer circuit (126). The feedback loop (104) provides for automatic gain control of the voltage command signal for yielding high speed operation. The gain-adjusted voltage command signal is thereafter applied to a bipolar voltage driver (102) having high motor damping characteristics. The voltage driver (102) is utilized to control the application of a bus voltage to the motor winding (106) of a stepper motor via a transistor control logic circuit (148). Also included is a time constant correction network (138) for accelerating the settling of variations in the motor current to steady state. Thus, the correction network (138) ensures a rapid response to changes in the commanded motor current.

25 Claims, 2 Drawing Sheets

MIXED MODE STEPPER MOTOR CONTROLLER AND METHOD

BACKGROUND OF THE INVENTION

Field of the Invention

The present invention relates to motor controllers. More specifically, the present invention relates to methods and apparatus for stepper motor control.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Description of the Related Art

Stepper motors are utilized in position control systems such as in commercial satellites and antenna positioning systems. Desirable characteristics in a stepper motor controller include good motor rotor damping and high speed motor capability independent of bus voltage and motor winding resistance. These characteristics are very difficult to achieve in the same stepper motor controller design. Generally, high speed motor controllers have poor motor damping characteristics. After a stepper motor completes a positioning cycle, the mechanical oscillations generated by operation of the motor must settle out. Poor damping characteristics can result in motor instability. At certain resonant step rates, the rotor oscillations increase so that the motor is no longer functional.

The problems associated with low motor damping are well documented. To minimize the negative effects associated with dynamic problems of many stepper motors, such as unstable operating regions, external mechanical hardware has been employed. An example of mechanical hardware includes a viscous damper which introduces a direct torque drag on the motor rotor. Although some success has been achieved with mechanical devices, speed capability is generally sacrificed. Further, use of mechanical damping devices result in high power consumption and a poor economy of operation.

Another technique commonly employed to improve motor damping involves the use of diode snubber circuits in parallel with the motor winding. However, this solution also limits speed capability and results in high power consumption.

The main categories of stepper motor drivers include the voltage driver, the modified L/R voltage driver and the current driver. An example of a stepper motor voltage driver is a unipolar voltage driver utilized for low precession positioners on commercial satellites. The voltage driver sequentially applies the bus voltage to the four motor windings and provides good motor damping. However, the voltage driver is only usable at low motor speeds because the back electromotive force (back EMF) generated in the motor windings opposes the drive voltage. Since the back EMF generated is directly proportional to motor speed, the amount of current flowing in the motor winding is suppressed at higher speeds. Thus, motor torque is proportionally reduced.

Further, the torque generated by a stepper motor utilizing a voltage driver varies directly with bus voltage and inversely with winding resistance. The drive voltage fluctuates with the bus voltage and the winding resistance varies with changing winding temperature. A varying winding resistance provides a varying motor winding current. Each of these conditions can provide a non-constant motor torque adversely affecting motor performance. Additionally, the stepper motor that employs the voltage driver is also limited to low speed operation by the inductance-to-resistance (L/R) time constant of the motor winding. When the source voltage is impressed across the motor winding, the inductive component of the winding impedance (Z) slows the current response to the new voltage. This property creates a problem at high step rates because the inductance of the motor winding suppresses the current flow.

In order to avoid the problems associated with the stepper motor voltage driver, the voltage driver design must be modified. An example of a modified design is the (L/R) voltage driver, the second category of stepper motor drivers. The objective of the L/R voltage driver is to overcome the effect of the inductive component of the motor winding that slows the current response at higher step rates. In order to accomplish this goal, a large fixed resistance is placed in series with the inductive component of the motor. The large series resistance makes the inductive component a smaller percentage of the overall impedance (Z) of the motor winding. Further, a larger voltage source is required to drive the motor current through the large series resistance. This modified design provides for a faster motor current rise time and makes the back EMF voltage in the motor winding a smaller percentage of the total drive voltage. This feature tends to extend the high speed performance of the motor. Finally, the large series resistance causes the motor winding resistance to be a smaller percentage of the total motor resistance. Therefore, the motor winding resistance and thus the motor torque is less sensitive to changes in the motor winding temperature.

Unfortunately, certain disadvantages exist with the L/R voltage driver design. These disadvantages include inefficient power dissipation in the large series resistance. Additionally, motor damping is further sacrificed because the large series resistance increases the overall impedance (Z) of the motor winding. Thus, the back EMF voltage drop in the large series resistance is increased which suppresses back EMF current flow resulting in reduced damping.

The third category of stepper motor drivers is the current driver. Examples of a current driver include a unipolar current driver and a bipolar current driver. Each of these examples are employed in positioning systems. A significant enhancement associated with the stepper motor current driver is the direct control of the current in the powered winding. This feature increases maximum motor speed and permits motor performance to be essentially independent of bus voltage and winding resistance. Thus, the current driver overcomes several of the disadvantages associated with a voltage driver. However, a true current source provides no electrical damping leaving only limited mechanical damping in, for example, the gears of the stepper motor. Therefore, the main problem associated with current drivers is the absence of damping of the motor rotor. The absence of damping of the stepper motor rotor in a current driver results in unstable motor operating regions. Thus, step rates that produce resonance in the motor must be avoided.

In order to protect the motor drive transistors, many of the prior art stepper motor drivers place a diode snubber network across the motor winding. The diode snubber network, in addition to limiting voltage across the drive transistors, also provides a partial current path for back EMF currents. Back EMF currents of a single polarity can flow through the diodes providing limited damping of the motor rotor. The snubber circuit can be tailored to a particular motor winding circuit. This is accomplished by introducing a resistance component in the snubber network which permits increasing rotor damping at the expense of motor speed response and vice versa.

Finally, some stepper motor drivers combine the four motor windings into two new windings. This combination of motor winding connections is utilized in bipolar operation. A advantage of bipolar operation is that the motor power efficiency is doubled. The bipolar mode of operation can employ either simple, low speed voltage control with good rotor damping or, in the alternative, high speed current control with essentially zero rotor damping.

Thus, there is a need in the art for improvements in stepper motor drivers which exhibit good motor damping and high speed performance which is independent of bus voltage and winding resistance.

SUMMARY OF THE INVENTION

The need in the art is addressed by the mixed mode controller and method of the present invention. The invention includes a mechanism for generating a command signal to operate a motor and a first circuit for adjusting the gain of the command signal to provide high speed operation. A second circuit is provided for converting the command signal to a drive signal to excite a winding and to damp the motor.

In a preferred embodiment, a step rate signal introduced into the motor controller is operated upon by an accumulator and a memory to generate a voltage command signal. The motor controller includes a low bandwidth current control feedback loop utilized to adjust the gain of the voltage command signal by comparing a command motor current and an actual motor current in a summer circuit. The feedback loop provides for automatic gain control of the voltage command signal for yielding high speed operation. The gain-adjusted voltage command signal is thereafter applied to a bipolar voltage driver having high motor damping characteristics. The voltage driver is utilized to control the application of a bus voltage to the motor winding of a stepper motor via a transistor control logic circuit. The voltage driver provides very good motor damping. Also included is a time constant correction network for accelerating the settling of variations in the motor current to steady state. Thus, the correction network ensures a rapid response to changes in the commanded motor current.

DESCRIPTION OF THE INVENTION

Figure 1:
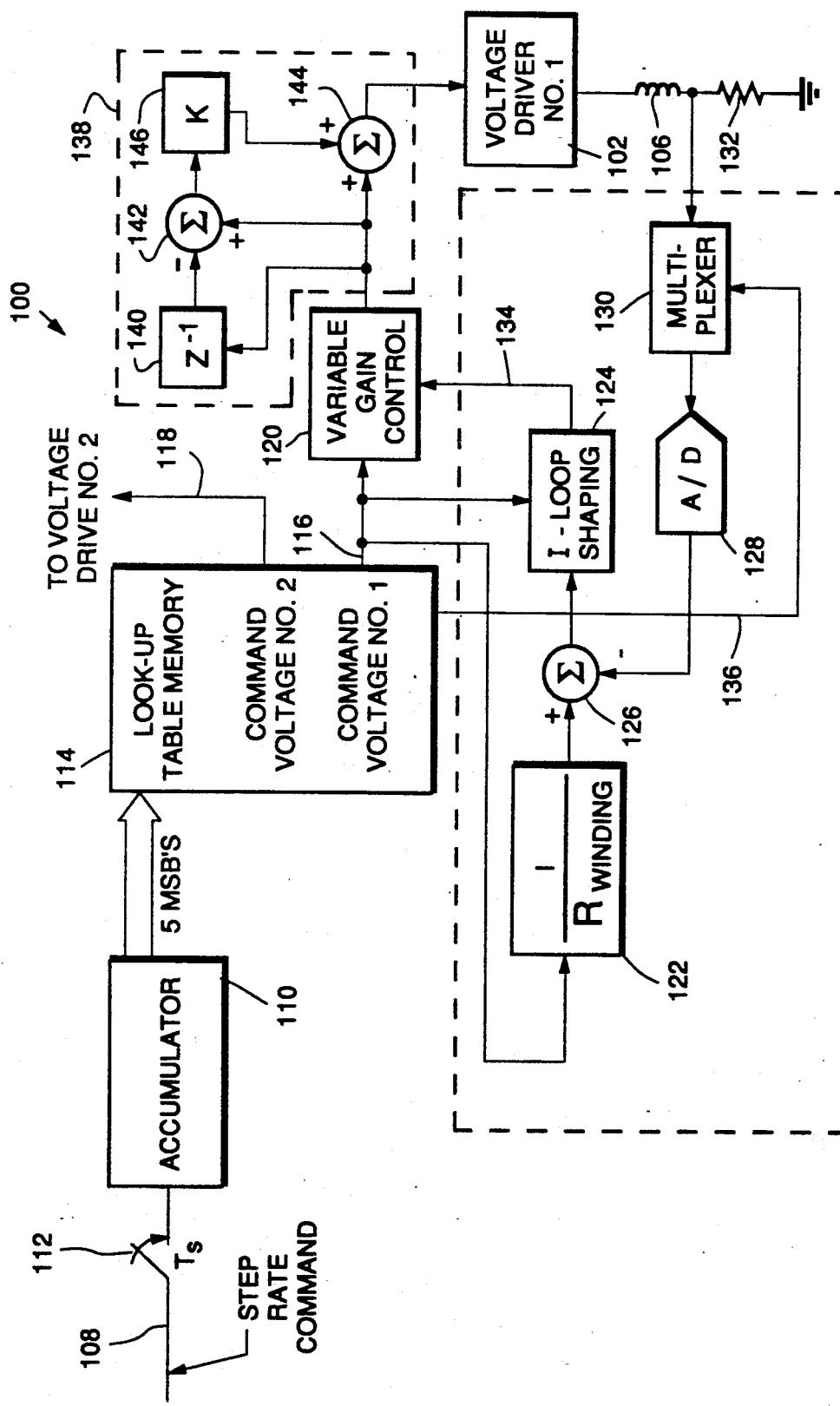
FIG. 1 is a block diagram of an illustrative embodiment of the mixed mode stepper motor controller of the present invention showing a current control feedback loop and a controller connected to a step rate command input terminal.

The invention is embodied in a mixed mode stepper motor controller 100 of the type having a bipolar voltage driver 102 for driving a stepper motor and a low bandwidth current control feedback loop 104 for controlling the current flow from the voltage driver 102 as shown in FIG. 1. Generally, the bipolar voltage driver 102 and the low bandwidth current feedback loop 104 cooperate to substantially improve motor damping by controlling the voltage applied across a powered motor winding 106 and to simultaneously provide power efficient, high speed motor operation by controlling the current flowing from the bipolar voltage driver 102. Further, motor performance is essentially independent of bus voltage, motor temperature and winding resistance, and the stepper motor controller 100 utilizes virtually identical hardware for many standard motors.

The mixed mode stepper motor controller 100 of the present invention is described herein as a digital processing implementation. However, the present invention can also be embodied in an equivalent analog processing implementation. A step rate command is transmitted to the controller 100 on an input line 108 as shown in FIG. 1 from a servo-controller (not shown). The step rate command is a fixed digital number which dictates the rate or frequency of operation of a bipolar motor. The bipolar motor can include a permanent magnet rotor centered among four pole pieces. Four motor windings are combined into a sine winding and a cosine winding wrapped about two of the pole pieces, respectively, affording a doubled motor power efficiency.

The step rate command is added to an accumulator 110 every $T_s$ seconds which represents the loop sample period. The fixed loop sample period $T_s$ is symbolized by the periodic operation of a switch 112 shown in FIG. 1. The loop sample period $T_s$ is the inverse of the fixed operating frequency (f) of the controller 100 as indicated in equation 1 as $$T_s = 1/f \quad [1]$$

A function of the accumulator 110 is to digitally integrate the step rate command to transform the rate command to a rotor position command. This function is applicable, for example, with the rotor of the bipolar motor. Several bits of an output signal from the accumulator 110 are utilized to address a look-up table memory 114. The look-up table memory 114 contains the nominal command voltage signal (at a first output terminal on a line 116) for the motor winding 106 as shown in FIG. 1. A second output terminal is also available to provide a nominal command voltage signal to another motor winding in a second voltage drive (not shown) on a line 118. These two windings correspond to the sine and cosine windings of the bipolar motor.

A minimum of two bits of the output signal from the accumulator 110 must be used to define the four winding voltage states associated with full stepping of, for example, the two-phase bipolar motor. In the illustration of FIG. 1, five bits of the count of the accumulator 110 are employed to define thirty-two states of the motor. This procedure provides greater resolution and allows each motor step to be sub-divided into eight micro-steps. Nominally, the two motor winding states follow a sine/cosine pattern. However, this pattern must be modified slightly to provide for consistent micro-step size in a motor with appreciable magnetic detent torque.

The nominal command voltage signal for the motor winding 106 is then directed to the low bandwidth current control feedback loop 104 and to a variable gain control device 120. The function of the feedback loop 104 is t provide an automatic gain control feature to maintain an average current in the bipolar motor winding 106. This is accomplished by comparing the actual motor current to the commanded motor current as described hereinbelow. Within the feedback loop 104, the command voltage signal from the memory 114 is transmitted to a multiplier device 122 and to a current loop shaping device 124. The multiplier device 122 represents the reciprocal of the nominal resistance of motor winding 106 and thus is symbolized as ($1/R_{winding}$) in FIG. 1. Thus, the multiplier device 122 operates on and converts the command voltage signal to a command current signal as follows $$I_{command} = V_{command} \times (1/R_{winding}) \qquad [2]$$

The command current signal is the nominal value of current assigned to flow in the motor winding 106. The command current signal is then delivered to a first summer 126 as shown in FIG. 1. The first summer 126 also includes an input from the combination of an analog-to-digital (A/D) converter 128 and a multiplexer 130. The input from the A/D converter 128 represents the actual current flowing in the motor winding 106 which is sensed by a small sensor resistor 132. The sensor resistor 132 is much smaller than, for example, the resistance of the motor winding 106. The voltage across the sensor resistor 132 is proportional to the current flowing in the motor winding 106. Thus, the voltage across the sensor resistor 132 is utilized to sense the actual motor current signal. The sensor resistor 132 is located in the motor circuit between the winding 106 and electrical ground as shown in FIG. 1. The sensed actual motor current signal is then routed to the multiplexer 130 and the A/D converter 128.

The bipolar motor includes two separate motor windings with each motor winding having a sensor resistor. Therefore, the multiplexer 130 associated with the plurality of sensor resistors performs a plurality of functions. One of these functions includes multiplexing between the separate windings of the same motor. Further, multiplexer 130 permits the single A/D converter 128 to be time shared among the plurality of motor windings. An illustrative embodiment of the voltage driver 102 shown in the schematic switching diagram of FIG. 2 discloses two sensor resistors 132a and 132b. For any given motor winding, the multiplexer 130 selects which sensor resistor 132a or 132b should be connected to the feedback loop 104 and monitored. This is accomplished b transmitting an instruction signal between the look-up table memory 114 and the multiplexer 130 on a line 136. The instruction signal to monitor one particular sensor resistor as opposed to another is determined by the polarity of the command voltage signal from the look-up table memory 114. Thereafter, the multiplexer 130 connects the selected sensor resistor 132a or 132b to the feedback loop 104.

The voltage across the sensor resistor 132 is proportional to the current flowing in the motor winding 106. The analog voltage sensed across the sensor resistor 132 is transmitted to the A/D converter 128 via the multiplexer 130. The A/D converter 128 converts the analog voltage received from the multiplexer 130 to a digital signal. After being digitized, the actual motor current signal is transmitted to the first summer 126 to be compared with the command motor current signal which is derived by the expression in equation 2. The output signal of the first summer 126 represents the difference between the command motor current signal and the actual motor current signal. The differential current signal from the first summer 126 is directed to the current loop shaping device 124. Further, the input signal from the memory 114 to the current loop shaping device 124 is to indicate the polarity of the command voltage signal.

By comparing the magnitude of the actual motor current signal to the magnitude of the command motor current signal, the low bandwidth current control feedback loop 104 can adjust the driving function accordingly. In this manner, the current loop shaping device 124 will increase the gain control signal when the magnitude of the actual motor current signal is less than the magnitude of the command motor current signal (e.g., gain-up or boost the driving function). Likewise, the current loop shaping device 124 will decrease the gain control signal when the magnitude of the actual motor current signal is greater than the magnitude of the command motor current signal (e.g., gain-down or reduce the driving function). In its simplest form, the current loop shaping device 124 multiplies the differential signal from the first summer 126 by +1 or −1 depending on the polarity of the command voltage signal in the memory 114. Thereafter, the current loop shaping device 124 performs a simple integration on the differential signal.

The output signal of the current loop shaping function 124 is a gain control signal which is transmitted to the variable gain control device 120 on a line 134 shown in FIG. 1. The nominal command voltage signal originating in the look-up table memory 114 is operated upon by the gain control signal in the variable gain control device 120. The variable gain control device 120 is employed to adjust (e.g., increase or decrease) the magnitude of the nominal command voltage signal in accordance with the differential signal provided by the first summer 126. Applying the gain control signal to the command voltage signal within the variable gain control device 120 closes the current control feedback loop and provides the automatic gain control feature.

As the motor speed increases, the back EMF voltage increases which tends to suppress the motor current. The current control feedback loop 104 will sense a change in the magnitude of the average motor current and will adjust the driving function accordingly. Thus, the average motor current can be maintained and the bipolar motor can operate at high stepping rates. However, by keeping the bandwidth of the current control feedback loop 104 below the natural oscillatory frequency of the motor, the oscillatory back EMF voltage and hence the damping characteristics will not be suppressed. It should be noted that the feedback loop 104 will also compensate for variations in the power supply voltage and in the resistance of the motor winding 106.

The adjusted command voltage signal is then transmitted from the variable gain control device 120 to an L/R time constant correction network 138 as shown in FIG. 1. The time constant correction network 138 will temporarily exaggerate any step change in the adjusted command voltage signal. This exaggeration of the step change permits the new steady state motor current value associated with the step change indicated by the equation $$I_{ss} = V_{command}/R_{winding} \quad [3]$$

to be achieved in one sample period $T_s$ as opposed to waiting for the normal current rise time in an inductive circuit. The motor winding 106 includes an inductive component having a normal current rise time of five time constants after the step change which is represented by the equation $$\text{Time constant} = L_{winding}/R_{winding} \quad [4]$$

The time constant correction network 138 is useful for maintaining the command motor current signal at high step rates by shortening the normal current rise time. However, the correction network 138 is considered to be an optional feature of the stepper motor controller 100 of the present invention.

The adjusted command voltage signal is directed from the variable gain control device 120 to a time delay operator device 140 designated by the symbol $(Z^{-1})$, a second summer 142 and a third summer 144, respectively. The symbol $Z^{-1}$ of the time delay operator device 140 denotes a time delay of one sample period $T_s$. Thus, the function of the time delay operator device 140 is to provide temporary storage of the adjusted command voltage signal of the previous sample period $T_s$. The second summer 142 receives and compares the adjusted command voltage signal of the previous sample period $T_s$ from the time delay operator device 140 and the adjusted command voltage signal of the present sample period $T_s$ from the variable gain control device 120. If the value of the command voltage signal of the present sample period has varied from that of the previous sample period, a command voltage differential signal is generated.

The command voltage differential signal is then transmitted to a multiplier block 146 shown in FIG. 1. The multiplier block 146 includes a multiplying factor "K" which operates on the command voltage differential signal to provide a fixed gain to compensate for the difference between the command voltage signals of the present and previous sample periods. The value of the multiplying factor "K" is defined as $$K = [(e^{-RTs/L})/(1 - e^{-RTs/L})] \quad [5]$$

where "R" equals the resistance and L equals the inductance, respectively, of the motor winding 106 and $T_s$ equals the loop sample period. The output of the multiplier block 146 as determined by equation [5] is directed to the third summer 144 and combined with the command voltage signal of the present sample period $T_s$. The output signal of the third summer 144 of the L/R time constant correction network 138 provides a controller voltage signal to the input terminal of the voltage driver 102 as shown in FIGS. 1 and 2.

Figure 2:
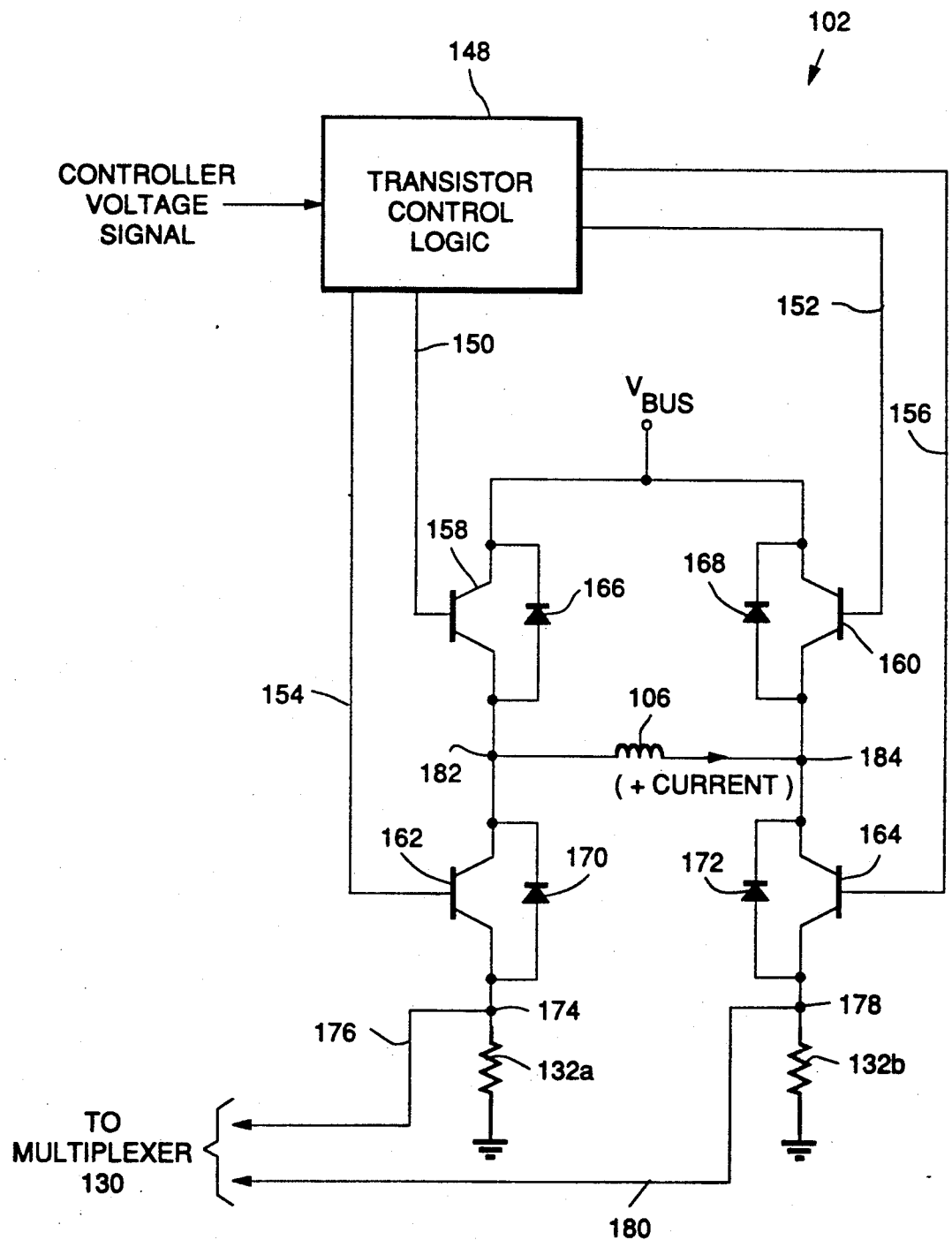
FIG. 2 is a more detailed schematic diagram of a voltage driver of the mixed mode stepper motor controller of FIG. 1 illustrating a representative transistor circuit.

The voltage driver 102 is a low impedance power output stage of which a digital embodiment is shown in FIG. 2. The voltage driver 102 includes a transistor control logic circuit 148. The controller voltage signal is applied to the transistor control logic circuit 148 for controlling the switching circuitry. The transistor control logic circuit 148 can be a logic circuit known in the art that determines the switching scheme of a plurality of transistors based upon the controller voltage signal. Various designs of the voltage driver 102 can be utilized in the present invention. The selected transistor switching circuit employed for controlling the current flow through the motor winding 106 appears in FIG. 2 and includes a plurality of connection lines 150, 152, 154 and 156. The connection lines 150, 152, 154 and 156 are routed from the transistor control logic circuit 148 to a plurality of switching transistors 158, 160, 162 and 164, respectively. Connected across each transistor 158, 160, 162 and 164 is one of a plurality of diodes 166, 168, 170 and 172, respectively, as shown in FIG. 2. Each of the diodes 166, 168, 170 and 172 are designed to protect the individual transistor from excessive voltage stress.

Switching transistors 162 and 164 are connected to sensor resistors 132a and 132b, respectively. The sensor resistors 132a and 132b are each, in turn, connected to electrical ground. Located between switching transistor 162 and sensor resistor 132a is a first voltage tap 174 connected to a line 176. Additionally, located between transistor 164 and sensor resistor 132b is a second voltage tap 178 connected to a line 180. Each of the lines 176 and 180 are circuited to the multiplexer 130. Connected between switching transistors 158 and 160 is the D.C. bus voltage $V_{bus}$. The motor winding 106 is connected between first and second motor terminals 182 and 184, respectively, as shown in FIG. 2.

The switching transistor network of the voltage driver 102 is a digital approximation of a true voltage source. Thus, the transistors 158, 160, 162 and 164 and the D.C. bus voltage $V_{bus}$ operate as a digitally controlled voltage source. The following is a description of the operation of the switching scheme of the preferred embodiment of the stepper motor controller 100 of the present invention. Because the motor is of a bipolar design, there are only two windings. However, for illustration purposes, only one motor winding 106 is shown. Since only two windings are available, the voltage is first impressed on winding 106 to cause current to flow through the winding from the positive direction to the negative direction as shown by the arrow in FIG. 2. Thereafter, the voltage is impressed on motor winding 106 to cause the current to flow through the winding from the negative direction to the positive direction. This is accomplished by the transistor switching scheme described hereinbelow.

When the controller voltage signal is positive, transistor 160 is latched off (e.g., an open switch), transistor 164 is latched on (e.g., a closed switch) and transistors 158 and 162 are alternately switched on and off at a high rate. The high rate of switching (8 KHz in this example) provides voltage pulses which induce the flow of current in the positive direction through the motor winding 106 to permit the motor to step. The effective voltage applied to the motor winding 106 when the controller voltage signal is positive is proportional to the percentage of time that transistor 158 is latched on during the switching cycle. The percent of time that any transistor is latched on during the switching cycle is controlled by the transistor control logic 148. Thus, the effective voltage in this example is expressed in equation form as $$V_{eff} = V_{bus} \times (\% \text{ time transistor 158 on}) \quad [6]$$

The resulting actual motor current is sensed as a voltage drop across the shunt sensor resistor 132b. It is noted that at the instant of switching the transistors 158 and 62, there is a short deadband in which both transistors 158 and 162 are commanded off. This action prevents the possibility of both transistors 158 and 162 being simultaneously latched on and shorting the D.C. bus voltage $V_{bus}$ to ground.

Conversely, if the controller voltage signal is negative, transistor 158 is latched off, transistor 162 is latched on and transistors 160 and 164 are alternatively switched on and off at the high rate. This action provides voltage pulses which induce the flow of current in the negative direction through the motor winding 106. The actual motor current is sensed as a voltage drop across the shunt sensor resistor 132a. The effective voltage applied to the motor winding 106 when the controller voltage signal is negative is proportional to the percentage of time that transistor 160 is latched on during the switching cycle. The percent of time that any transistor is latched on during the switching cycle is controlled by the transistor control logic 148. Thus, the effective voltage in this example is expressed in equation form as $$V_{eff} = -V_{bus} \times (\% \text{ time transistor 160 on}) \quad [7]$$

Additionally, at the instant of switching the transistors 160 and 164, there is a short deadband in which both transistors 160 and 164 are commanded off. This action prevents the possibility of both transistors 160 and 164 being simultaneously latched on and shorting the D.C. bus voltage $V_{bus}$ to ground.

The transistor switching scheme of the voltage driver 102 provides four separate switching states. Two of the switching states occur when the controller voltage signal is positive and transistors 158 and 162 are alternately switched on and off. The two remaining switching states occur when the controller voltage signal is negative and transistors 160 and 164 are alternately switched on and off. In the first switching state, the controller voltage signal is positive and transistor 164 is latched on. The path of current flow in the first state when transistor 158 is latched on is from the bus voltage $V_{bus}$ source through transistor 158, through the motor winding 106 in the positive direction, through transistor 164 and sensor resistor 132b and, finally, to electrical ground. Under these conditions, the full bus voltage $V_{bus}$ is applied across the motor winding 106 inducing a positive current flow through winding 106 was shown in FIG. 2.

In the second switching state, the controller voltage signal is positive and transistor 164 is latched on. The motor winding 106 is isolated from the bus voltage $V_{bus}$ because transistors 158 and 160 are latched off. Under these conditions, transistors 162 and 164, which are both latched on, short circuit the motor winding 106. As an example of the operation when the controller voltage signal is positive, assume that $V_{bus}$ is +20 volts and transistor 164 is latched on. When transistor 158 is latched on and transistor 162 is latched off, the voltage across winding 106 is +20 volts. However, when transistor 162 is latched on and transistor 158 is latched off, the voltage across winding 106 is zero. If each of the transistors 158 and 162 are alternatively latched on for 50% of the switching cycle, the effective voltage across the winding 106 for the switching cycle is +10 volts in accordance with equation [6].

In the third state of the four switching states, the controller voltage signal is negative and transistor 162 is latched on. The path of current flow in the third state when transistor 160 is latched on is from the bus voltage $V_{bus}$ source through transistor 160, through the motor winding 106 in the negative direction, through transistor 162 and sensor resistor 132a and, finally, to electrical ground. Under these conditions, the full bus voltage ($V_{bus}$) is applied across the motor winding 106 in such a way as to induce a negative current flow through winding 106. In the fourth switching state, the controller voltage signal is negative and transistor 162 is latched on. The motor winding 106 is isolated from the bus voltage $V_{bus}$ source because transistors 158 and 160 are latched off. Under these conditions, transistors 162 and 164, which are both latched on, short circuit the motor winding 106.

As an example of the operation when the controller voltage signal is negative, assume that $V_{bus}$ is 20 volts and transistor 162 is latched on. When transistor 160 is latched on and transistor 164 is latched off, the voltage across winding 106 is 20 volts but has a polarity which induces a negative current flow. Thus, the voltage across motor winding 106 is effectively -20 volts. However, when transistor 164 is latched on and transistor 160 is latched off, the voltage across winding 106 is zero. If each of the transistors 160 and 164 are alternatively latched on for 50% of the switching cycle, the effective voltage across the winding 106 for the switching cycle is -10 volts in accordance with equation [7].

The transistors 158, 160, 162 and 164 each function as an electrical switch which is either latched on or off. Consequentially, current is caused to flow in both directions through the motor winding 106. During two of the four switching states, the full bus voltage $V_{bus}$ is impressed across the motor winding 106 while in the remaining two switching states, zero volts is impressed across the motor winding 106. Thus, the voltage across the motor winding 106 begins to look like a chopped D.C. signal. Because the switching scheme also causes the polarity to change as the bipolar motor is stepped, the voltage across the motor winding 106 in the bipolar motor can be characterized as digital A.C.

Variations in the switching scheme of the present invention are foreseen and two alternatives are disclosed herein. A first alternative switching scheme utilizes the voltage driver 102 shown in FIG. 2. When the controller voltage signal is positive, a positive drive voltage is provided in the following manner. Transistors 160 and 162 are latched off and transistor 164 is latched on. Thereafter, transistor 158 is switched on and off. If the bus voltage $V_{bus}$ is +-20 volts and transistor 158 is latched on for 50% of the switching cycle, the effective voltage across the motor winding 106 is +10 volts. Because of the motor inductance and the high frequency switching of transistor 158, the calculated effective voltage from equation [6] is a good approximation. While this scheme is somewhat simpler than the preferred switching technique, a disadvantage exists. The diode 170 across transistor 162 prevents the back EMF voltage generated by the motor from driving the motor current in the negative direction which results in reduced damping.

A second alternative switching scheme also utilizes the voltage driver 102 shown in FIG. 2. When the controller voltage is positive, a positive drive voltage is provided in the following manner. Transistors 158 and 164 are latched on as a pair while transistors 160 and 162 are latched off as a pair. Immediately thereafter, transistors 160 and 162 are latched on as a pair while transistors 158 and 164 are latched off as a pair. The effective voltage applied across the motor winding 106 is determined by the percentage of time that transistors 158 and 164 are latched on during the switching cycle. For example, when transistors 158 and 164 are latched on, the entire bus voltage $V_{bus}$ of +20 volts is applied across the motor winding 106. When transistors 160 and 162 are latched on, the entire bus voltage $V_{bus}$ of 20 volts is applied across the motor winding 106 with the opposite polarity. Thus, the effective voltage range is from −20 volts to +20 volts. If transistors 158 and 164 are latched on for ¾ of the switching cycle and transistors 160 and 162 are latched on for ¼ of the switching cycle, the effective voltage is +10 volts.

While the second alternative switching scheme provides full motor damping, it also yields much higher motor ripple current. The switching schemes of the preferred embodiment and the first alternative embodiment each derive the output voltage by alternately switching between $V_{bus}$ and zero volts. However, the switching scheme of the second alternative embodiment derives the output voltage by alternately switching between $+V_{bus}$ and $-V_{bus}$. Further, the voltage driver 102 also suffers from severe non-linearities near the zero value of the controller voltage signal. The controller voltage signal is near zero value when the on-time of transistors 158 and 164 is nearly equal to the on-time of transistors 160 and 162. The non-linearity is a result of the required deadband, e.g., the short time period, during which both pairs of transistors (158, 164) and (160, 162) are switched off to prevent a direct short circuit to ground. Because of these disadvantages with the first and second alternatives, the preferred switching scheme described in conjunction with FIG. 2 is recommended.

The sequence of the four switching states determines the rotation of the motor. Thus, for example, the switching state sequence 1, 2, 3, 4 might cause motor rotation in the clockwise direction while the opposing switching sequence 4, 3, 2, 1 might cause rotation in the counter-clockwise direction. Although, an A/D converter 128 is required to convert the analog voltage measured across sensor resistor 132 shown in FIG. 1 to a digital signal, a matching digital-to-analog (D/A) converter is not required. This is because the voltage applied to the motor winding 106 is digitally controlled by the transistors 158, 160, 162 and 164. The transistors, which are controlled by the transistor control logic 148, are either latched on or off. The stepper motor controller 100 of the present invention thus does not interfere with the analog operation of the motor.

The controller 100 allows a stepper motor (such as the bipolar motor) to be well damped and to be driven at high speeds. These advantages can be attained without requiring the use of an external damper and without consuming large amounts of power as is necessary when employing a viscous damper. Damping is maximized when the oscillatory component of the back EMF has a current path through the motor driver and thee motor windings. It is the current path for the back EMF that provides the damping. Excellent damping is provided in the stepper motor controller 100 of the present invention by driving the stepper motor with the controlled bus voltage $V_{bus}$ source. This design provides a low impedance path for the motor generated back EMF voltages which induces current flow to yield the maximum possible passive electrical damping of the motor.

It is the combination of the direct control of the bus voltage $V_{bus}$ in the motor winding 106 and the low bandwidth current control feedback loop 104 in a bipolar motor design that provides the advantages of high speed operation, excellent motor damping and performance independent of the bus voltage and winding temperature. The direct control of the bus voltage in the winding 106 provides the high damping characteristic while the current control feedback loop 104 provide the high speed operation and performance independent of the bus voltage $V_{bus}$ and temperature variations. Further, the use of the voltage driver 102 is significant in improving the damping characteristic since a voltage driver does not buck the back EMF voltage. Thus, back EMF currents are permitted to flow to provide damping which tends to brake the motor which provides motor stability.

The back EMF voltage is a high frequency signal which manipulates the current flowing through the motor winding 106. A current control feedback loop having a high frequency bandwidth tends to buck the high frequency EMF voltage to regulate the instantaneous motor current in the winding 106. Therefore, the current control feedback loop 104 shown in FIG. 1 has a low frequency bandwidth which is sufficiently slow to permit the back EMF current to flow through the low impedance path provided by the voltage driver 102. The low bandwidth feedback loop 104 does not buck the back EMF voltage and thus controls the average value of the motor current in winding 106. By allowing current to flow in response to the back EMF, good motor damping is obtained.

Damping is desired to suppress unwanted oscillations of the bipolar motor rotor. The back EMF voltage generated as a result of the unwanted oscillations is not correlated to the command voltage signal on line 116 of motor controller 100. As such, the back EMF voltage will not tend to affect the average current in the motor winding 106. Since the bandwidth of the current feedback loop 104 is set below the frequency of the rotor oscillations, the back EMF will produce a current flow through the voltage driver 102 and the motor winding 106. This current flow will provide the maximum possible passive electrical damping of the motor rotor. This damping is essentially equivalent to that obtained by shorting both windings of the bipolar motor.

Back EMF voltages are also produced by the desired motion of the rotor as the bipolar motor is being operated. This back EMF voltage is correlated to the command voltage signal on line 116 of the motor controller 100. Under these conditions, the back EMF voltage will tend to suppress the average current in motor winding 106. The current feedback loop 104 will detect the change in the average motor current and will increase the amplitude of the command voltage signal through the use of the variable gain control device 120. The increased amplitude of the command voltage signal, when applied to the voltage driver 102, effectively bucks the back EMF component which results from the desired rotation of the motor. Thus, the undesired motion of the rotor is heavily damped while the desired motion is unimpeded.

It is noted that each of the elements of the mixed mode stepper motor controller 100 of the present invention except the voltage driver 102, the motor winding 106, the A/D converter 128, the multiplexer 130 and the sensor resistor 132 can be implanted in a digital processor.

The present invention discloses an embodiment of the stepper motor controller 100 that is hardware compatible with either stepper or direct drive motors. In general, the motor voltage driver 102, the motor winding 106, the sense resistor 132, the A/D converter 128, the multilexer 130 and the circuit board layout are identical for the stepper and direct drive motors. Only the software which controls the hardware elements requires modification to substitute a direct drive motor for a stepper motor and vice versa. Additionally, the switching sequence chosen for the plurality of transistors of the voltage driver 102 is more linear, provides for full motor damping and yields the smallest possible ripple current for a switching driver. The stepper motor controller 100 of the present invention will be useful in future position control systems as well as present positioning systems. Potential uses cover a broad range of stepper motor applications including, but not limited to, mechanically steered sensors, movable control surfaces, computer disk drives and antenna positioning systems.

Thus the present invention has been described herein with reference to a particular embodiment for a particular application. Those having ordinary skill in the art and access to the present teachings will recognize additional modifications, applications and embodiments within the scope thereof. Although the mixed mode stepper motor controller 100 of the present invention has been described herein as a digital processing implementation, the present invention can also be embodied in an equivalent analog processing implementation.

It is therefore intended by the appended claims to cover any and all such modifications, applications and embodiments within the scope of the present invention.

Accordingly,

What is claimed is:

1. A mixed mode controller for use with a motor comprising:
   means for generating a command signal to operate said motor;
   means for adjusting the gain of said command signal to provide high speed operation;
   means for converting said command signal to a drive signal to excite a winding and to damp a rotor of said motor; and
   wherein said means for generating a command signal includes an accumulator.

2. The mixed mode controller of claim 1 wherein said accumulator converts a motor step rate signal to a rotor position signal.

3. The mixed mode controller of claim 1 wherein said means for adjusting the gain of said command signal includes a low bandwidth current control feedback loop.

4. The mixed mode controller of claim 3 wherein said feedback loop includes means for providing a command motor current signal for comparing with an actual motor current signal.

5. The mixed mode controller of claim 4 wherein said means for providing said command motor current signal includes a multiplier for multiplying said command signal by the reciprocal of the resistance of said motor winding.

6. The mixed mode controller of claim 3 wherein said feedback loop includes means for providing an actual motor current signal for comparing with a command motor current signal.

7. The mixed mode controller of claim 6 wherein said means for providing said actual motor current signal comprises a multiplexer.

8. The mixed mode controller of claim 6 wherein said means for providing said actual motor current signal comprises an analog-to-digital converter.

9. The mixed mode controller of claim 3 wherein said feedback loop includes a first summer for combining a command motor current signal and an actual motor current signal to provide a differential signal.

10. The mixed mode controller of claim 9 wherein said feedback loop includes means for integrating said differential signal.

11. The mixed mode controller of claim 10 wherein said feedback loop further includes a variable gain control for receiving said integrated differential signal and for adjusting the magnitude of said command signal.

12. The mixed mode controller of claim 1 wherein said means for converting said command signal to a drive signal includes a motor voltage driver having means for controlling the application of a source voltage to said motor winding.

13. The mixed mode controller of claim 12 wherein said controlling means comprises a transistor log circuit.

14. The mixed mode controller of claim 12 wherein said controlling means comprises a plurality of transistor switches.

15. The mixed mode controller of claim 1 further including means for sensing the current through said motor winding comprising a plurality of sensing resistors connected to said motor winding.

16. The mixed mode controller of claim 1 further including a time constant correction network for accelerating the settling of the current to steady state in said motor winding.

17. The mixed mode controller for use with a stepper motor comprising:
   means for generating a voltage command signal to operate said motor;
   means for adjusting the gain of said voltage command signal to provide high speed operation, said adjusting means including a low bandwidth current control feedback loop;
   means for converting said voltage command signal to a motor drive signal to excite a winding and to damp a rotor of said motor; and
   means for sensing the current through said motor winding, said sensed motor winding current being transmitted to said feedback loop for readjusting the gain of said voltage command signal.

18. A method for controlling a motor, said method comprising the steps of:
   generating a voltage command signal to operate said motor;
   adjusting the gain of said voltage command signal to provide high speed operation;
   converting said voltage command signal to a motor drive signal;
   exciting a winding and damping a rotor of said motor with said motor drive signal;
   sensing said current through said motor winding; and
   transmitting said sensed motor winding current to a feedback loop to readjust the gain of said voltage command signal.

19. The method of claim 18 further including the step of converting a motor step rate signal to a rotor position signal.

20. The method of claim 18 further including the step of converting a rotor position signal to said voltage command signal.

21. The method of claim 18 further including the step of combining a command motor current signal and an actual motor current signal to provide a differential signal.

22. The method of claim 21 further including the step of integrating said differential signal to adjust the magnitude of said voltage command signal.

23. The method of claim 18 further including the step of controlling the application of a source voltage to said motor winding.

24. The method of claim 18 further including the step of accelerating the settling of the current to steady state in said motor winding.

25. A method for controlling a motor, said method comprising the steps of:

generating a voltage command signal to operate said motor;

adjusting the gain of said voltage command signal to provide high speed operation;

converting said voltage command signal to a motor drive signal;

exciting a winding and damping a rotor of said motor with said motor drive signal, said motor drive signal being generated by a switching sequence;

passing a current through the positive direction of said motor winding during a first stage and interrupting said current during a second stage of said switching sequence;

passing said current through the negative direction of said motor winding during a third stage and interrupting said current during a fourth stage of said switching sequence;

sensing said current through said motor winding; and transmitting said sensed motor winding current to a feedback loop to readjust the gain of said voltage command signal.

* * * * *